United States Patent [19]

Bellamy

[11] Patent Number: 5,377,485
[45] Date of Patent: Jan. 3, 1995

[54] ELECTRIC POWER CONVERSION SYSTEM

[75] Inventor: Norman W. Bellamy, Coventry, England

[73] Assignee: Hydro Energy Associates Limited, Gloucestershire, England

[21] Appl. No.: 938,269
[22] PCT Filed: Mar. 28, 1991
[86] PCT No.: PCT/GB91/00488
§ 371 Date: Oct. 22, 1992
§ 102(e) Date: Oct. 22, 1992
[87] PCT Pub. No.: WO91/17359
PCT Pub. Date: Nov. 14, 1991
[51] Int. Cl.⁶ .................... F16D 31/02; H02K 7/18
[52] U.S. Cl. ............................ 60/398; 290/42; 290/52
[58] Field of Search .............. 60/398, 532, 639; 290/42, 52, 53; 417/150, 100

[56] References Cited

U.S. PATENT DOCUMENTS

| 199,819 | 1/1878 | Frizell . |
| 233,499 | 10/1880 | Frizell . |
| 338,295 | 3/1886 | Pohle et al. . |
| 347,196 | 8/1886 | Pohle . |
| 543,410 | 7/1895 | Taylor . |
| 543,411 | 7/1895 | Taylor . |
| 618,243 | 1/1899 | Taylor . |
| 659,270 | 10/1900 | Webber . |
| 662,884 | 11/1900 | Starke . |
| 669,995 | 3/1901 | Linton . |
| 676,016 | 6/1901 | Webber . |
| 680,951 | 8/1901 | Waterhouse . |
| 704,059 | 7/1902 | Linton . |
| 748,898 | 1/1904 | Webber . |
| 825,719 | 7/1906 | Gutermuth . |
| 880,187 | 2/1908 | Blakney . |
| 892,772 | 7/1908 | Taylor . |
| 893,222 | 7/1908 | Bernstein . |
| 955,124 | 9/1910 | Berstein . |
| 1,005,911 | 10/1911 | Wilbur . |
| 1,007,095 | 10/1911 | Girard . |
| 1,031,143 | 7/1912 | Mueller . |
| 1,047,961 | 12/1912 | Maltbie . |
| 2,077,482 | 11/1934 | Jones et al. . |
| 4,396,842 | 8/1983 | Jhun ............................ 290/42 |
| 4,441,029 | 4/1984 | Kao ............................. 290/52 |
| 4,490,232 | 12/1984 | Lapeyre ....................... 290/53 X |
| 4,599,854 | 7/1986 | Mayo .......................... 290/52 X |
| 4,629,904 | 12/1986 | Rojo, Jr. et al. ............. 290/52 |
| 4,782,663 | 11/1988 | Bellamy ...................... 290/53 X |
| 4,947,647 | 8/1990 | Jensen ........................ 60/398 X |

FOREIGN PATENT DOCUMENTS

| 100799 | 2/1984 | European Pat. Off. . |
| 162814 | 11/1985 | European Pat. Off. . |
| 3716093 | 1/1988 | Germany . |
| 206778 | 12/1982 | Japan . |

Primary Examiner—Edward K. Look
Assistant Examiner—Hoang Nguyen
Attorney, Agent, or Firm—Klauber & Jackson

[57] ABSTRACT

The low head energy in for example a river flow is used to provide electrical energy by directing the water through a duct (70), and by inducing air into the duct to create an air flow which is drawn over an air turbine (76) to excite same, and thereby produce electrical energy. The air can be introduced into the flowing water in the duct by a switching arrangement to ensure that no bubbles or pockets of air travel along with the water, which impairs efficiency. The duct may be in the shape of an anti-gravity course (70) to prevent the bubbles from travelling.

29 Claims, 8 Drawing Sheets

ELECTRIC POWER CONVERSION SYSTEM

This invention relates to hydro-electric power systems, and in particular concerns a conversion system for converting the energy, especially but not exclusively head energy in liquids to a more readily usable form, for example electrical energy. The invention has particular utility for low water head applications such as on rivers, and possibly tidal sites. By low head as used in this specification is meant water head from 1 m to 10 m, the systems being adapted to produce power capacities in the range 100 kw to 10 mw. Although the system of the invention has particular and best application to these low water head applications, it is not suggested that the inventive system could not be used with higher or lower head capacities, and it can be used for converting kinetic energy in liquids.

When one considers the conventional installations which are utilised for the production of electrical power, one immediately identifies (a) power stations which use a fossil fuel, and (b) hydro-electric installations utilising heads of water to drive water turbines. The system of the present invention is best compared with the hydro-electric power stations in that the head or kinetic energy in water or the like is converted into energy in a readily useable form, but the system of the present invention can be compared with both of the abovementioned conventional systems in providing for the production of electrical power at a lower unit cost than the hydro-electric power stations and fossil fuel fired power stations.

Low head hydro-electric power was in fact used extensively from the end of the last century, and the flow of many European rivers was controlled by weirs or barrages to provide the necessary water head. The majority of the river structures remain but are unused as power sources, because of the poor economics involved in converting the water heads of such structures into electrical energy using conventional water turbines. This is due to the fact that it is expensive to convert low head energy by means of large diameter, slow speed water turbines. These redundant structures are now creating more interest in that the cost of electricity generation has escalated sharply in recent times.

For example, for developing countries, conventional hydro-electric power appears to be the most economically attractive way for providing the country'electrical power, but in many cases the huge capital costs and absence of an adequate electrical distribution system, leads to the result that the adoption of conventional hydro-electric power stations is not possible. A large number of schemes operating on a small head however provide an alternative and more economical source of electrical power.

In the United Kingdom, recent legislation has enabled private organisations to generate and sell electricity to the Central Electricity Generating Board and frequently it will be attractive to such organisations because of the proximity to a suitable water site, to deploy a low head energy conversion system for producing electrical power from the available water head. In the United Kingdom, there are many suitable sites, such as old mill sites which could be used for the generation of small power outputs suitable for supplying the national grid or the needs of the owner of the site, and perhaps a number of surrounding users.

It is believed that the potential for low head hydro-electric power is likely to be considerable in the not too distant future.

There have previously been proposed at least two systems for the conversion of low head water energy to another form suitable for providing electrical energy, and the first scheme is set out in British Patent Application 2096706A, which discloses a water engine comprising a plurality of vanes arranged as a barrage. The water by its head and/or kinetic energy acting on one side of the barrage causes a reaction on the vanes moving the vanes in the direction of the barrage until an extreme position is reached when the vanes change inclination and the water reaction causes the vanes to move in the opposite direction. This mechanical reciprocation of the vanes is utilised for providing electrical energy. It is believed that the mechanical complexities of this device will cause problems in operation.

Another low head system which has been proposed is disclosed in a paper presented by Coventry Lanchester Polytechnic September 1984, authors Peatfield, Duckers, Lockett, Loughridge, White and West and as published in U. K. Patent Specification No. 2143284 which comprises an enclosed chamber into which available water flow is directed in order to effect displacement of air above the water level. The water flow can be controlled by the operation of inlet and outlet valves in such a way that the effective driving pressures for both the filling and emptying cycles can be a large portion of the head available at the site chosen. The operational cycle commences with the opening of the water inlet valve, allowing water into the empty chamber with the outlet valve closed, filling the chamber with water and driving the air out under pressure through a turbine known as a Wells turbine, which is of a bi-directional drive type in that the propelling air can be passed over the blades in either direction and will drive the turbine in the same direction as compared to the uni-directional conventional turbine which requires the fluid to pass through the blades in one direction only. At a suitable point near the end of the filling cycle the inlet valve is closed and the outlet valve is then opened allowing exit of the water to the downstream side of the water retaining structure. This emptying process causes air to be sucked back into the chamber through the still rotating Wells turbine which is thus used to extract energy at the optimum rate during both parts of the cycle. Then at a suitable point near the bottom of the emptying cycle, the outlet valve is closed and the whole cycle recommences with the re-opening of the inlet valve.

This system is viewed as having problems concerning the opening and closing of the inlet and outlet valves which must operate once per 10 seconds, and such high frequency long term operation could lead to operating difficulties.

In European Application 0198445, another form of hydro-electric power conversion system is described in which the flow of water is caused to pass along a conduit. In the conduit are membranes, and the water flows over the membranes in turn. The system also includes air which is alternately pumped between cavities defined to the underside of the membranes, as a result of the water flowing over the membranes in sequence. The back and forth displacement of the air is used to drive a Wells turbine in order to provide output power.

Whilst this system works extremely satisfactorily, in fact a difficulty has been identified with the system as a result of testing a full size model, and that difficulty resides in the provision of a sufficiently large and strong membrane. In other words the difficulty is a practical one. Furthermore such a large membrane is a rather expensive as well as being liable to failure.

The present invention seeks to provide a hydro-electric power conversion system which bears similarity to the arrangement described in said European patent application insofar as flowing water is used in order to pump air (or other gas), and the air so pumped is used for the driving of a prime mover such as an air turbine of the Wells or other type. The system according to the present invention however is such as to render the requirement for the provision of a membrane unnecessary.

According to the present invention there is provided an energy conversion system for converting the energy in liquid which flows from a higher level to a lower level, comprising duct means through which the liquid is caused to flow in flowing from said higher level to the lower level, means for introducing a gas into the duct means so that it is moved along the duct means by the flowing of liquid, and some of the potential energy of the liquid is transferred into kinetic energy in the gas, and including kinetic energy conversion means arranged to convert the kinetic energy of the gas into energy in a more readily usable form.

Preferably the water flow is switched in flow direction by means enabling the introduction of said gas which preferably is air.

The switching may be achieved by means of a valve or vane which may be a mechanical valve or vane or a pneumatic valve or vane. In another arrangement, switching is achieved by small movements of adjacent wall portions and/or by pilot jets.

The duct means may be a single duct extending between the higher and lower levels, but in one arrangement, in the region of the higher level discrete pockets of air are introduced into the water so that slugs of water travel down the duct and between the slugs are pockets of entrapped air which air in being moved from the high level to the low level to areate the gas flow.

The single duct is preferably a venturi duct or a syphon and the introduction of air is effected either by passive means at the low pressure point of the venturi/syphon or by the use of a low pressure turbine.

With this further arrangement there is also the possibility that the water in the duct will collapse to the bottom of the duct and therefore cause the air in the pockets to move to the top side of the duct, and the end result could be that air in the pockets will accummulate with a single volume preventing further flow between the high level and the low level ends. This risk is overcome if the duct section in side view is shaped in the form of an antigravity curve.

Moreover, the duct section may be enlarged towards the lower level in order to enhance the pressure difference between the higher and lower levels.

In the past, direct air entrainment methods such as disclosed in European Patent Application No. 016284 have not proved effective in harnessing low head hydroelectric power despite their simplicity and potential low costs. The problem of low efficiency lies with the severe loss mechanisms associated with flow regimes which can occur in two phase flow (air and water) systems. For given flows of the two phases in a given duct the air water interfacial distribution can take any of an infinite number of possible forms. Significant air entrainment gives to irregular secondary water flows, such as recirculation and vortexing, primary flow becomes unsteady and disorganised. Further increases in air proportion creates conditions for stall which forms dead water regions and the primary flow falls into a jet flow regime.

The key requirement of an efficient air entrainment power conversion system is to create organised two-phase flow patterns which avoid lossy secondary flow and stall. Preferably the proportion of air to water needs to approach 50% if the air injection pressure is to be kept to a fraction of atmospheric pressure which is necessary to avoid cavitation. Direct continuous air injection, which normally produces more bubbles, cannot achieve organised flow patterns for significant air/water proportions. However, as described above, it is possible to use switched air injectors to insert discrete pockets of air into a venturi or venturi/syphon water duct to produce an organised flow pattern. This reduces the loss mechanism in the two phase flow to give improved water to air power conversion efficiency.

As described above air to be injected via a switched air injection means may be supplied through a low pressure turbine into an injector throat at a region where the water pressure is at its lowest, or alternatively the air may be supplied directly from the atmosphere, and the injected air is carried through the antigravity expanding duct before being separated for collection in a centrifugal bend. The exit air is collected at atmospheric pressure or above and either fed back to the low pressure turbine to provide a closed circuit operation or alternatively dispersed to the atmosphere.

In an arrangement comprising a venturi duct it is envisaged that air injectors will be located within or near to the venturi throat, the throat being designed to produce negative air pressure approximately equal to the applied water head. Alternatively, in a syphon duct the air injectors will be located within or near to the low pressure-region. Preferably the air injectors are located adjacent a hydrofoil such that air is made to flow therearound and discrete pockets of air are produced within the liquid. Once the pockets of air are formed they travel within the duct in the direction of flow of the water and are prevented from rising to the surface of the duct by means of the parabolic shape of the duct which overcomes the effects of gravity. In order to create a preferred pattern of air pockets within the water at least two air injectors are located adjacent to hydrofoils and the injectors are made to operate out of phase such that air pockets generated by the injectors travel lengthwise along the duct in staggered relationship. More specifically, switching air between alternate injectors causes water jets, defined by means of the edges between adjacent hydrofoils, to divert from one hydrofoil wall attachment to the other and it is during this process that an air pocket is created without disrupting water flow. Careful design of the injectors enables the air water switching to occur in fractions per second which results in the production of a staggered air packet pattern. The hydrofoils may be of any desired shape but preferably are tapered towards the end distal from the air injector.

Alternately, the duct means may be in two duct sections and there may be an upstream inlet duct section which can be coupled alternately with the high level ends of the said two pumping duct sections, and there may be a downstream duct section which by virtue of another switching arrangement can be alternately coupled with the outlet lower level ends of the pumping duct sections.

If the switching at the upper and lower levels operates in syhnchronism then the water flowing into the upstream section will be broken into slugs travelling alternately along the pumping duct sections, and the slugs will be regrouped into a single stream by the switching at the lower level downstream duct section, whereat incidentally the pressure air may be extracted.

This embodiment of the invention can function if the said pumping duct sections are straight and incline downwardly from the higher level to the lower level, but with this arrangement it may be difficult to keep the water slugs in coherent portions, because the water in the slugs will tend to collapse to the bottom of the duct section causing the air in the pockets to move to the top side of the duct, and the end result could be that air in the pockets will accumulate and form a large air seal preventing further flow between the high level and the low level ends.

To overcome the effect of gravity, which is the effect which causes the water to fall to the bottom of the duct sections, a particularly advantageous result is achieved if the duct sections (as in the previous embodiment) in side view are shaped in the form of an anti-gravity curve. An anti-gravity curve would be for example one which conforms to the shape of the parabola or other curve described by a jet of water which travels freely through air and is arranged with its exit axis upwardly inclined.

By so shaping the pumping duct sections in side view, so the water can be made to move in coherent slugs which tend not to collapse when in the pumping duct sections, thereby effectively trapping pockets of air and moving said pockets down the pumping duct sections to an outlet for the air at the lower level ends.

By so shaping the pumping duct sections, the duct sections can be arranged to operate in a syphonic manner so that the syphonic effect will pull water from the upper level into the pumping duct sections at the appropriate angle so that the slugs of water move on said anti-gravity parabola.

The switching between pumping duct sections may be achieved using air valves controlling the flow of air alternately into the top ends of the respective pumping duct sections.

Another embodiment of the invention has a single duct which has a venturi throat and a divergent downstream end extending from the throat. This embodiment makes use of the fact that if a jet of water comes into contact with an adjacent wall an effect called wall attachment takes place. The effect is due to fluid adjacent to the wall being swept away giving rise to low pressure at the wall surface. This causes the jet to bend towards the wall and remain attached to it along a gradual curvature. In such arrangement, the switching of the jet can be achieved by very small movements of the adjacent wall and/or jet. One method of switching a water jet between opposite walls of a venturi expansion chamber is to fit guide vanes operated by pilot air pressure signals and use is made of this effect in this embodiment of the invention.

The guide vanes only have to move fractional amounts to switch the water jet from wall to wall and hence they can utilise simple leaf springs rather than hinged elements. Normal alignment of each guide vane induces wall attachment and jet detachment is achieved by switching the pilot air input to a higher pressure (normally atmospheric) relative to the low pressure within the venturi throat. The pressure difference across the vane causes it to bend away from the wall and hence detach the jet. The pilot air also feeds the space left by the switching jet.

The pilot operated jet described eliminates the need for switching of the power input air of the venturi as embodied in some other embodiments of the present invention. There are preferably main power air connections to both sides of the duct downstream of the venturi throat to enable power air to be drawn into the pilot switched air side of the jet; the power air therefore automatically switches into the duct according to the low power switched pilot air.

Embodiments of the present invention will now be described, by way of example, with reference to the accompanying diagrammatic drawings, wherein.

Figure 1:
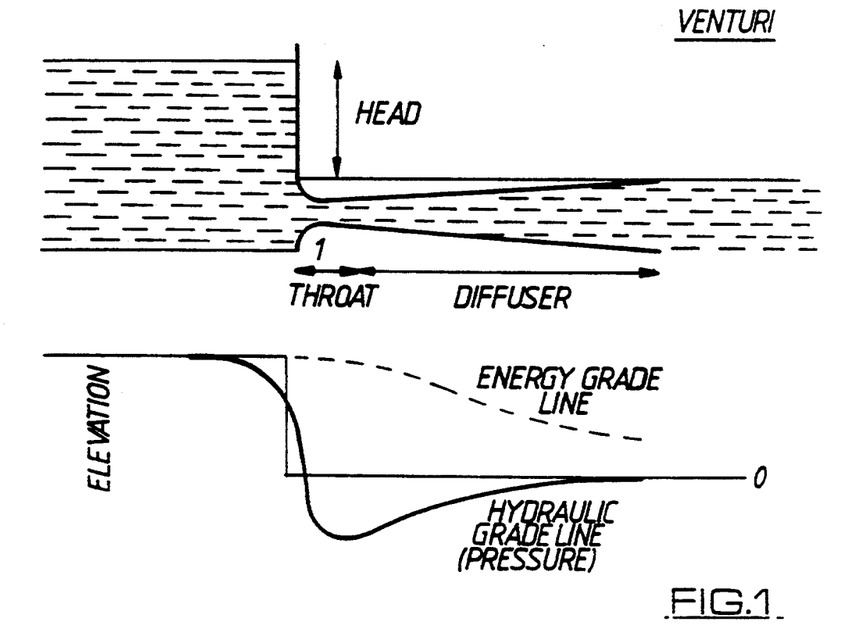
FIG. 1 shows a side sectional view of a venturi duct and below this is illustrated the energy and pressure profile of the system.

Referring now to the Figures and firstly to FIG. 1, a venturi duct is located below a head of water such that at the region of constriction, that is the throat, water flows at a high velocity and at low pressure. This can be seen by the energy and pressure profile of the system illustrated below the duct representation.

Figure 2:
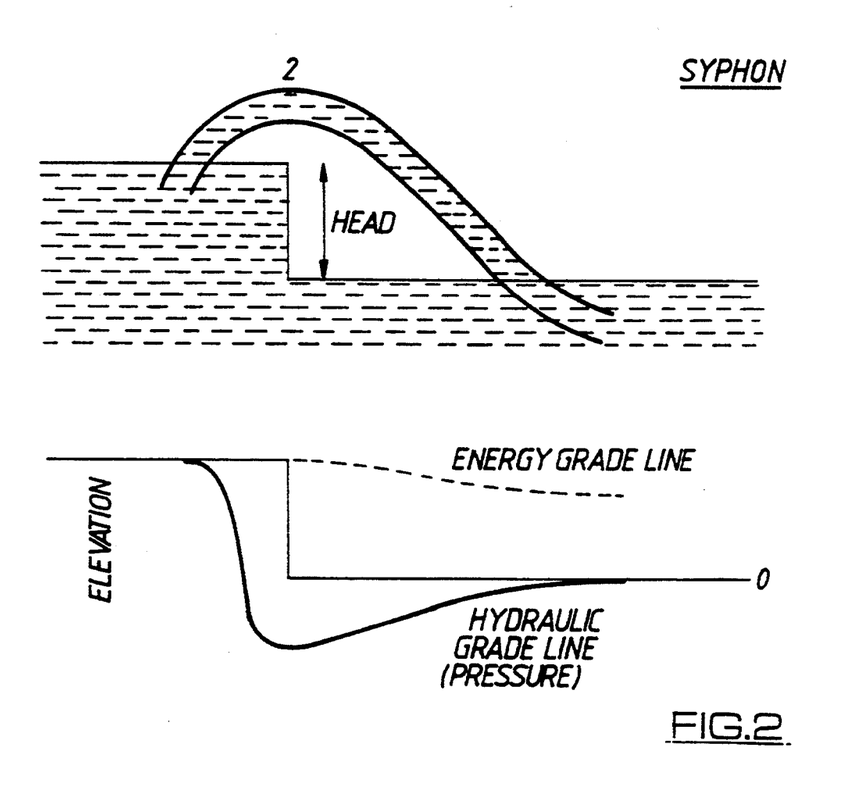
FIG. 2 shows a side sectional view of a syphon arrangement and below this is illustrated the energy and pressure profile of the system.

Similarly, in FIG. 2 a duct syphon arrangement is illustrated and it can also be seen that the energy and pressure profile of the system mimics those in a venturi system. The pressure profile is at its lowest at a point represented by the highest point of the syphon.

The reduction in pressure in either of the above two systems is important in a water to air power conversion system as it provides a region where air can be introduced by induction into the flow of water along its pressure gradient. This may be particularly advantageous as the introduction of air may thus be a passive process, that is to say without incurring a need for energy.

Figure 3:
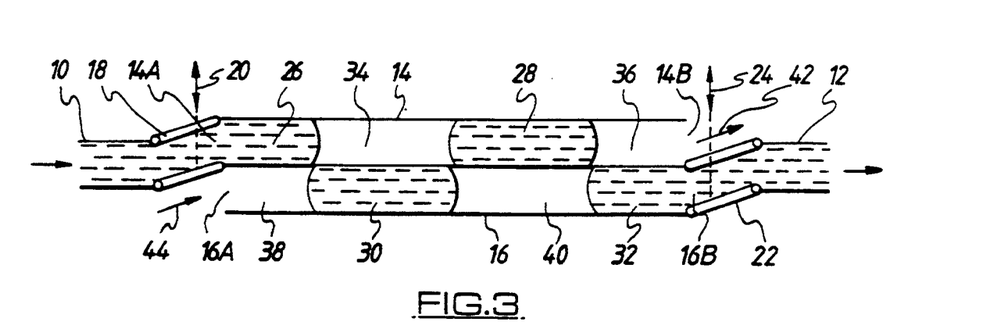
FIG. 3 shows a plan view of a hydro-electric power conversion system according to a first embodiment of the invention.

FIGS. 3 to 6 represent a first aspect of the invention and referring now to FIG. 3, a flow of water, which may be derived from a flowing river, weir or barrage or the like flows through an upstream duct section 10 and eventually emerges from a downstream duct section 12. The sections 10 and 12 are at different heights, section 10 being higher than section 12.

Connecting the upstream and downstream duct sections 10 and 12 are pumping duct sections 14 and 16 which lie side by side as shown. The sections 14 and 16 incline downwardly from the upstream section 10 to the downstream section 12, and the sections 14 and 16 have inlets 14A, 16A and outlets 14B, 16B.

Between the upstream section 10 and the inlets 14A, 16A is a switching valve 18 which is adapted to be moved back and forth as indicated by arrow 20 to direct the flowing water either into inlet 14A or 16A as will be described.

Similarly, there is a switch valve 20 for collecting water from outlet 14B or 16B and for changing same into the section 12. The valve 20 is adapted to be reciprocated as indicated by arrow 24.

The valves 18 and 22 are shown as operating antiphase so that whilst duct section 10 is charging water into the inlet 14A, duct section 12 is collecting water from outlet 16B.

The principle of the operation will be understood from the drawing in that as the valves 18 and 22 are oscillated as indicated by arrows 20 and 24, so the inflowing water is alternately fed into the respective ducts 14 and 16. Ideally what happens is that slugs of water 26, 28 travel down duct 14, and slugs of water 30, 32 flow down duct 16 and between the slugs are pockets of air 34, 36, 38, 40. The air is drawn into the inlets 14A and 16A alternately as indicated for example by arrow 44 in FIG. 3.

If desired the air which is pressurised and emerges from the outlets 14, 16 may be returned to the inlets 14A, 16A after passing over an air turbine to drive same for the extraction of electrical energy.

Figure 4:
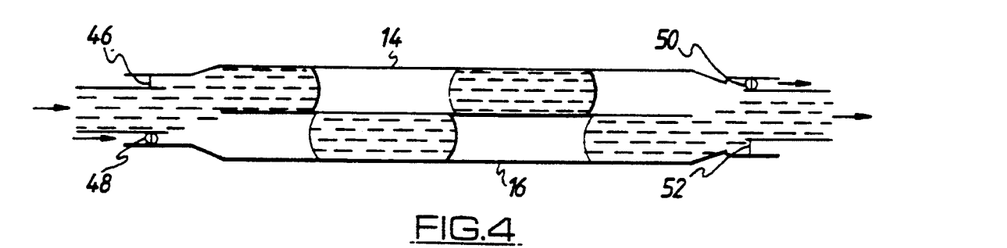
FIG. 4 shows a plan view of a system according to a second embodiment of the invention.

The alternative arrangement shown in FIG. 4 is similar to FIG. 3 except that the air inflow is controlled by means of air valves 46, 48 and the outflow similarly is controlled by air valves 50, 52. The operation of the FIG. 4 embodiment will be readily understood in that instead of mechanically driving the gate valves 18 and 22, the air valves 46, 48, 50 and 52 are alternately opened and closed to give a similar flow pattern through the duct sections 14 and 16.

When the duct sections 14 and 16 are straight, there is a tendency for the slugs of water 26, 28, 30 and 32 not to travel along the duct sections as coherent masses, but to tend to collapse into the bottom of the duct section, leaving the air to collect above the water. If the air collects in this way and the pockets of air eventually coalesce forming a large volume of air, then the apparatus can become air locked and will not function. Although therefore some pumping effect is achieved by the arrangements of FIGS. 3 and 4 and in the general concept of the invention are to be considered as within the scope of the invention, a far more effective system is shown in FIGS. 3 and 4.

Figure 5:
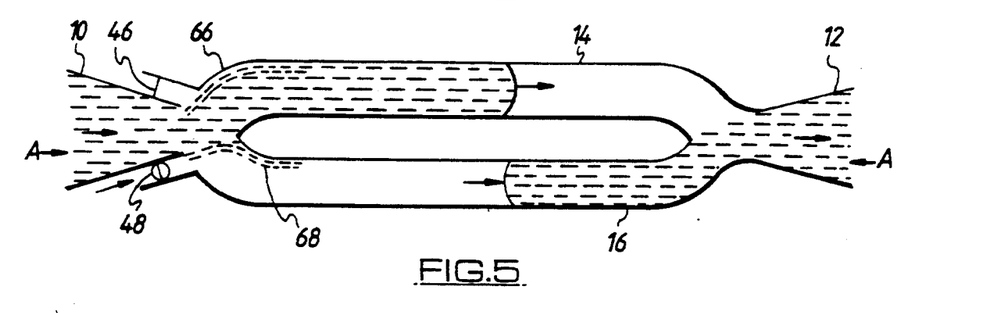
FIGS. 5 and 6 show respectively a plan and side elevation of the hydro-electric power conversion system according to a particularly advantageous embodiment of the invention.
Figure 6:
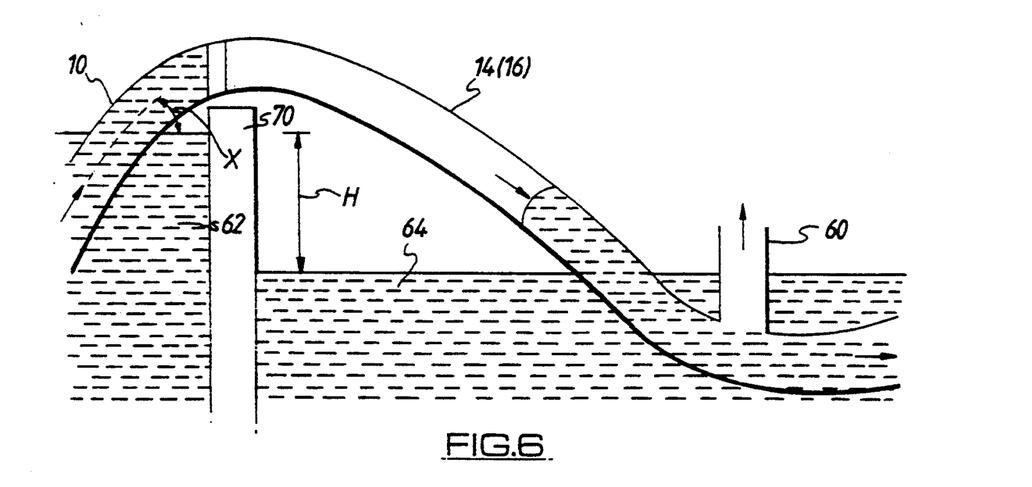
Figures 7, 8:
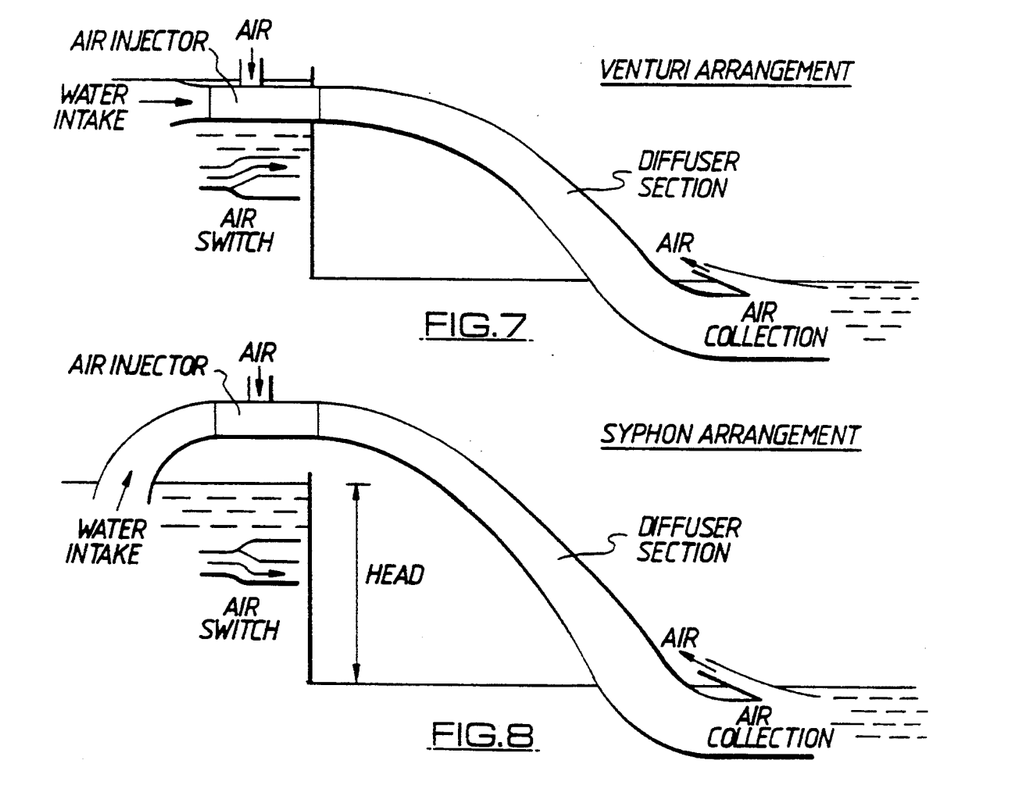
FIG. 7 shows a syphon duct located below a head of water with an air switch located in a first operative position.
FIG. 8 shows a syphon duct located above a water head with an air switch located in a second operative position.

Referring to these figures, parts already described in relation to FIGS. 3 and 4 have similar reference numerals, and indeed it will be observed that the only substantial difference in the FIGS. 5 and 6 embodiment compared to the FIGS. 3 and 4 embodiments is that the duct sections 14 and 16, and the upstream section 10 are formed in the shape of an anti-gravity parabola. The purpose of so shaping the sections is to provide that the slugs of water in travelling in this curve will at least temporarily be free of the effects of gravity. This means that the slugs will follow the parabolic path without collapsing and will fill the ducts 14 and 16 so that there will be maximum and effective pumping on the air pockets which are driven to an air exhaust 60 from which the pressure air can be collected and delivered to an air turbine.

The anti-gravity curve is the natural curve which would be followed by a jet of water which travels freely after it issues at the angle X in FIG. 6. The upstream section 10 it will be seen has an inlet end thereof immersed in an upstream body of water 62 presenting a head H in relation to the downstream body of water 64 so that in fact the water will be drawn into the duct sections 14 and 16 by a syphonic effect.

As shown in FIG. 5, the inlet and outlet duct sections 10 and 12 are of convergent and divergent shape in plan, and the air valves 46 and 48 are arranged to introduce air alternately into the sections 14 and 16 of which the inlets are curved as indicated so as to lie somewhat in alignment with the respective edges of the duct section 10. This has a particular advantage in that when the apparatus is in the condition shown in FIG. 5, the absence of air in the vicinity of the valve 46 means that the inflowing water will tend to be pulled to the inlet of duct section 14, and the inflow of air through valve 48 will force the water flow also into duct section 14. When the valves are switched, the absence of air in the vicinity of valve 48 creates a suction effect tending to pull the inflowing water into the duct section 16, and the simultaneous introduction of air through valve 46 causes the water to part from the outer wall of duct section 14 and so that the switching will be smooth and with minimum energy losses (the mechanical valve arrangement 18, 20 shown in FIG. 3 does suffer from mechanical energy losses).

The water can therefore be switched smoothly into opposite duct sections 14 and 16, and will effect maximum pumping of the air in the pockets. Energy can be extracted from the flowing air in any suitable manner (preferably by induction) using an air turbine, or alternative energy extraction arrangements may be utilised.

Modifications may of course be made, insofar as in the region of the valves 46 and 48 there may be vanes providing multiple inlets for the inlet ends of duct sections 14 and 16, and to enhance the switching of the water flow into the duct sections 14 and 16 there may be flexible membrane flaps 66 and 68 bridging the valve inlets of valves 46 and 48 to enhance the switching of the water slugs between the ducts 14 and 16.

The considerable advantage of the embodiments of the invention described, is that there is no pumping effect to be achieved by the utilisation of a flexible membrane, and the structure can be extremely simple.

The particular structure shown in FIGS. 5 and 6 has the additional advantage that because it is syphonic in nature, it can be raised from the upstream and downstream bodies of water without disturbing the weir or barrage 70 so that maintenance and repair can be effected easily.

In the systems described, the exhaust air may be pressurised by the equivalent water head, which is about half of the applied head, and its flow is roughly equal to the water flow. In idealised conditions both the water and air flows are intake and outlet are continuous and unidirectional. Air power output from such a system would be smooth and could be combined with parallel systems which may be out of phase with the first mentioned system. For example three systems operating in three-phase operation would provide smoother power output. The collection of the air at the downstream end of each of the devices may be by valve or surface collection.

Obviously the slugs of water and air must be of a length not exceeding the length of the duct section. The collected air may be returned by means of a closed circuit system back to the air inlet via an air turbine.

The initial horizontal velocity of the water where it enters the anti-gravity duct is dictated by the applied head.

The inlet air valves can take many forms and are preferably motor driven to achieve cycle times in the region of one second for a three meter head. Automatic valves operated on the basis of changing inlet air pressure can be used.

As mentioned herein the system described is simple in concept and does not require water valves or membranes. It may have a high power rating for its physical size giving low structural costs and it has a high water to air power efficiency. The unidirectional air flow will give smooth power and high air to shaft efficiency. The simple air valves which are used can tolerate air leakage and to a certain extent the system does not require any filtering of the water to remove trash or other debris provided that such materials are of a size which can pass directly through the ducts. The system is economical and requires only low cost civil engineering work to install.

A further embodiment is shown in FIGS. 7 to 13 where either a single venturi duct arrangement, located below a water head, or a single syphon duct arrangement, located above a water head, carries water from a first higher level to a second lower level and air is introduced into the duct at the point of lowest pressure. The means by which air is introduced into the duct may be either active insofar as it requires the input of energy, for example by means of a low pressure turbine, or it may be passive where no energy input is required, for example by means of passive diffusion along a pressure gradient.

Figure 9:
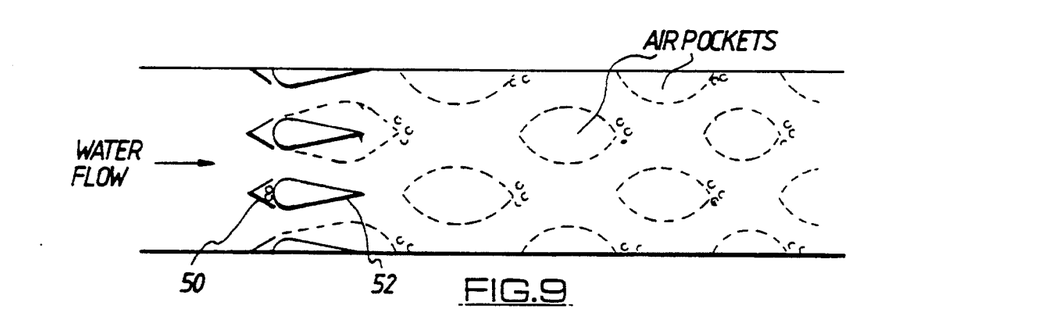
FIG. 9 shows a plan view of the syphon duct in either FIG. 7 or 8 at the point of air injection.

The air injection or induction means of the invention is shown in FIG. 9 and it comprises at least one air inlet 50 located immediately adjacent a tapered shaped hydrofoil 52.

Figure 10:
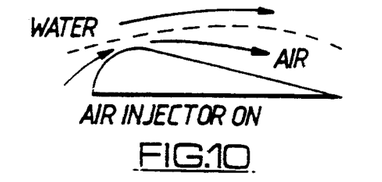
FIGS. 10 and 11 show a part-sectional view of an hydrofoil as seen in FIG. 9.
Figure 11:
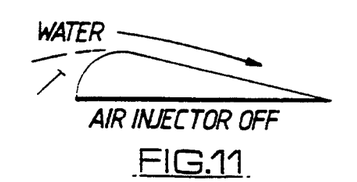

Thus it can be seen by reference to FIG. 10 that when the air injection means is switched on air flows about the surface of the hydrofoil 52 and a water jet defined by the edges between adjacent hydrofoils is deflected away from the flow of air. This has the effect of creating a discrete packet of air which flows about the surface of the hydrofoil in the direction of flow of the water until it eventually breaks free therefrom and travels progressively along the duct away from the region of low pressure. Conversely, as seen in FIG. 11, when the air injection means is switched off adjacent jets of water are no longer deflected away from the surface of the hydrofoil and thus flow thereabout. By sequentially alternating the operational status of adjacent air injectors it is possible to provide a staggered pattern of discrete air packets flowing within the water. The side sectional view of the duct represents an antigravity curve and the air packets are prevented from migrating to the upper surface of the duct as a result of the antigravity profile of the duct. The arrangement of the system is designed to minimize the amount of turbulence and so safeguard against the formation of air bubbles produced by the discrete packet of air dispersing.

Once the packets of air have been introduced into the system they flow along the duct from aa first higher level to a second lower level and in so flowing they are pressurised and thus provide a means of powering an air turbine system. It can therefore be seen that the entire arrangement can be air likened to an air pump where the induction and flow of can be used to drive a turbine.

Figure 12:
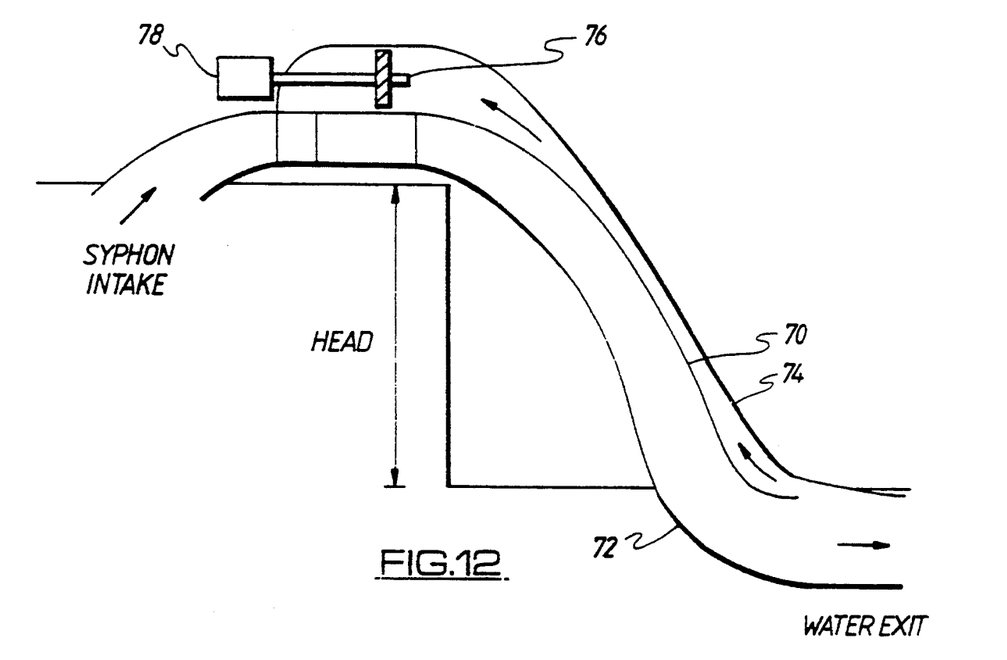
FIGS. 12 and 13 show in side view and plan another embodiment of the present invention.
Figure 13:
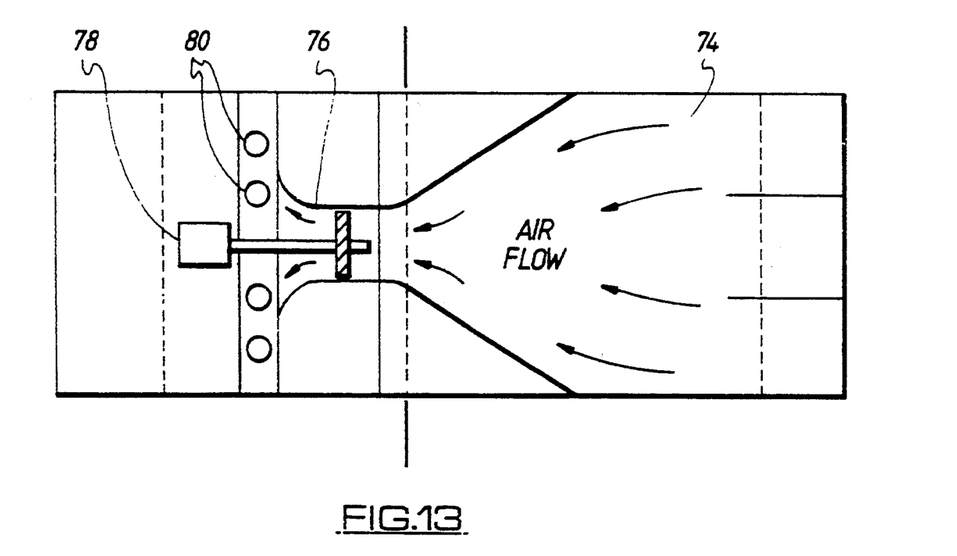

One arrangement is illustrated in FIG. 12 where a syphon duct 70 is curved 72 at its lower level such that air is hydrostatically forced to the upper surface of the duct where it is collected by a second duct 74 and returned to an air turbine 76 in order to operate a generator 78. FIG. 13 represents a plan view of FIG. 12 where it can be seen that pressurised air collected in duct 74 is returned to a turbine 76 and ultimately powers a generator 78. In this arrangement air valves 80 are integral with the injectors 50 and receive low pressure air direct from the turbine 76. The high-speed air turbine 76 can have wells or propellor type rotors and is directly coupled to an external induction generator or alternator. Air is ducted from the air collector and any losses made up by venting from atmosphere. In this system output power is steady and can be matched to the load by varying switching periods.

It is also envisaged, though not illustrated, that vertical separators may be located within the duct in line with water channels such that staggered layers of water packets may flow along the duct from a first higher level to second lower level. It is also envisaged that the air injectors may be arranged in a horizontal manner as opposed to a vertical manner in order to vary the nature of the air packet.

It will be understood, that although, in FIG. 9, a duct is shown having a plurality of air injectors in coordination with hydrofoils it is within the scope of the invention to provide a single injector pair with a horizontal expanding duct.

In a further alternative arrangement in accordance with FIG. 9, an additional channel may be provided along the outermost side of the peripheral hydrofoils, those located at the edge of the duct. This would enable a small jet of water 100 to flow about the outermost edge of the peripheral hydrofoils such that the air packet emerging therefrom will not be caused to interact with the duct wall and the result of this would be to reduce the risk of turbulence.

In the said described embodiments energy is generated from a flow of liquid such as for example the water flowing in a river bed in that the head causes flow to travel through a conduit, and by virtue of that flow air is drawn into the conduit and is caused to travel with the liquid, the inflow of the air into the conduit being utilised for the driving of a prime mover, such as an air turbine from which energy such as electrical energy can be derived.

By this means, electrical energy is produced simply from the flowing liquid. By virtue of the use of air turbines or other prime movers, practical systems can result, and the present invention comprises the disclosure of a number of empirical embodiments and features of the basic concept disclosed in said co-pending application.

The air entrapment in the water flow may result in a pressurisation of the air, and the air under pressure is used for the driving of the prime mover, but whilst this is a structural possibility, in practical terms this arrangement may cause problems as regards construction of an installation in that air chambers may have to be created so as to trap relatively large volumes of air under pressure as described in European Patent Specification No. 0162814 to make the equipment efficient. If this is not done, then inlet and outlet losses may be too great to render the system practical.

It is particularly advantageous to induce the air from the atmosphere using the flow of liquid, and to drive the prime mover by the air flow as it moves from the atmosphere and towards but before it is entrained in the flowing water, in all of the embodiments the collected air is simply returned to atmosphere; in such cases the switching device may not be necessary.

When the inflowing induced air is used for the driving of the prime mover, much of these disadvantages of the prior art are overcome, and it may not be necessary to establish any particular flow regime after the air is entrained in the water, although obviously if the entrainment can be controlled, there is a likelihood of higher efficiency. It is still desirable to control the amount of air which is entrained in the water for the reasons given pending application. Experience has shown however that much more simple structures and operation as disclosed herein may be adopted within the context of the concept described, whilst still achieving encouraging results.

Any of the features disclosed in any embodiment can be used in connection with any of the embodiment.

Figure 14:
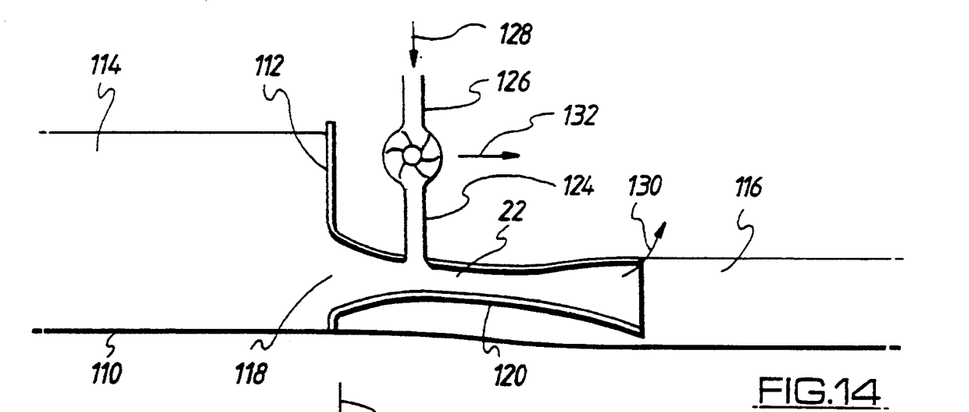
FIG. 14 is a diagrammatic sectional side view of an installation according to a basic forth of the invention.

Referring now to FIGS. 14 to 19 of the drawings, and firstly to FIG. 14, a water flow bed, typically a river bed 10 is shown, and provided to block the flow is a weir or barrage 12 thereby to define an upstream side 114 and a downstream side 116 in the flowing water. The head of water to the upstream side of the barrage is greater than the head of water to the downstream side 116.

The barrage or weir has an outlet 118 leading to a conduit 20 which is a venturi conduit having a throat 122.

As will be readily understood the water flows from the upstream side 114 through the conduit 120 to the downstream side 116 under the differential head between the upstream and downstream sides.

As the water flows through the throat 122 it will be drawn through an air turbine 126 of suitable design. Arrow 128 indicates the induction of air into the pipe 124 and through the prime mover 126 to drive same as the water induces the air into the throat 122. The air is returned to atmosphere as indicated by arrow 130. There is a dynamo two phase system in that the water and air flow continuously.

Arrow 132 indicates output power from the turbine 26, which may in the form of electrical energy, a suitable electrical generator being connected to the turbine 126 for this purpose.

FIG. 14 illustrates the basic elements of the system, but although the diagram is basic, it does illustrate the system which can function effectively. Improvements can of course be made, and FIG. 15 illustrates an alternative arrangement wherein higher efficiencies than the FIG. 14 arrangement are effected.

Figure 15:
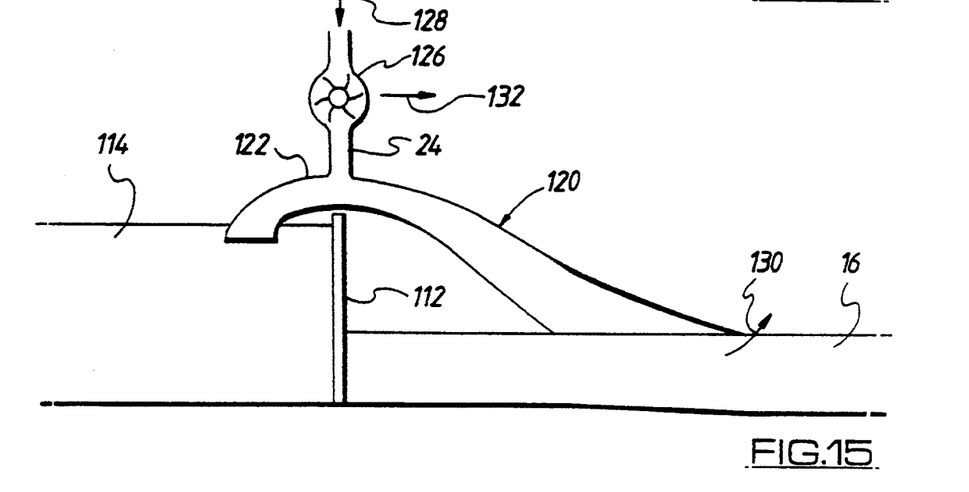
FIG. 15 is a sectional elevation similar to FIG. 14 but showing an alternative arrangement.

In FIG. 15, the weir or barrage 112 is not provided with any outlet aperture 18, but the conduit 120 is of inverted U-shape as shown so that it extends over the top of the weir 112, and its inlet and outlet ends are submerged in the water in the upstream and downstream sides 114 and 116. The conduit 20 therefore acts in a syphonic mode. It is shown as having a particular curvature, which may be an anti-gravity curvature as described hereinbefore or relating to other embodiments, but again a throat 122 is defined, and the pipe 124 for the same purpose connects to the interior of the conduit 120 in the region of throat 22. When the conduit 120 is primed and the water flows from the upstream side to the downstream side, negative pressure will be created at the throat to a greater level than the throat in the FIG. 14 embodiment, and greater volume of air will therefore be drawn into the conduit 120. The air is again exhausted at the downstream end as indicated by arrow 130.

In the arrangement of FIG. 15, a straight sectioned inverted U-shape conduit 120 is provided and it is of constant cross section, but in the downleg 120A, there is provided a restrictor 140 which is carried by an inlet pipe 142 through a suitable gland 144 so that the pipe 142 and the restrictor 40 can be raised and lowered as indicated by arrow 146. This means that the venturi effect which is created around the restrictor can be positioned at any height in down pipe 20 and therefore performance can be examined with the restrictor in any appropriate height position. The air is drawn into the system through the pipe 124 and over the prime mover 26 (not shown) and into pipe 142 and eventually emerges from appropriate apertures or outlet means in the flow restrictor 140. The flow restrictor 140 may be appropriately shaped so as to give best throttling and venturi effects.

Figure 16:
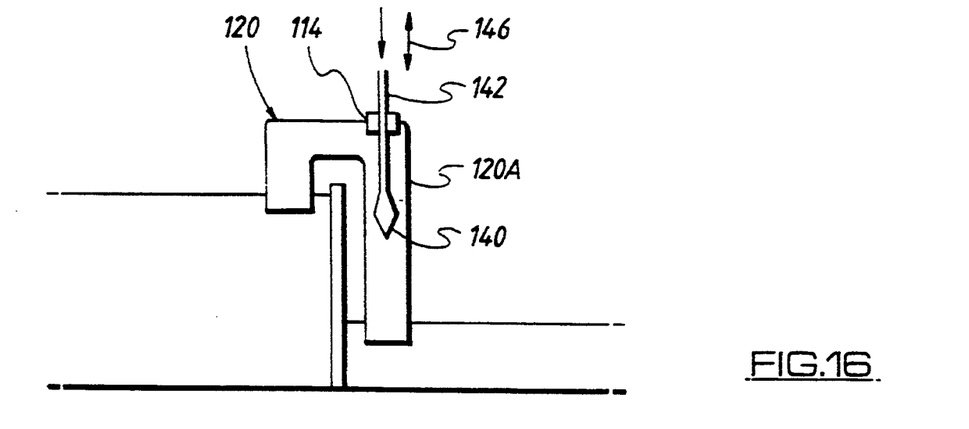
FIG. 16 is a view similar to FIG. 14 but showing a further embodiment, simplified in certain respects as compared with the embodiment of FIG. 13.

Basic experiments carried out with equipment substantially as illustrated in FIG. 16, but without the adjustable restrictor yielded encouraging results. It is believed that with the restrictor improved efficiencies will be achieved.

Figure 17:
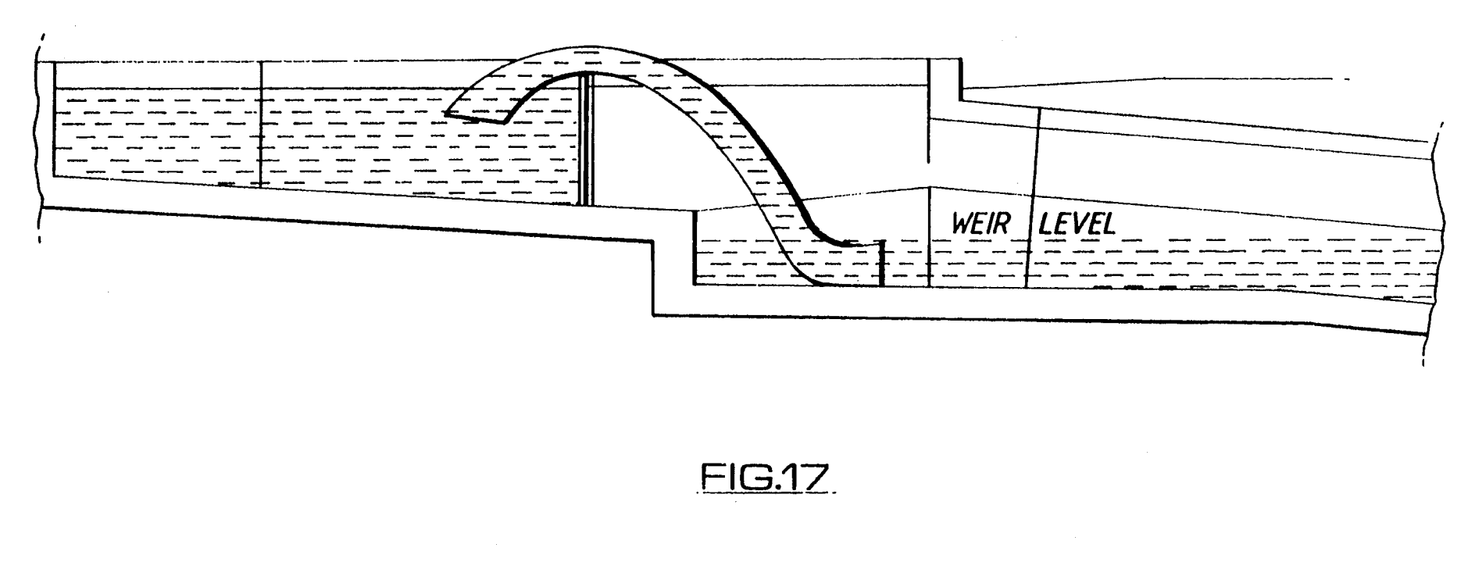
FIGS. 17 and 18 show in side elevation and plan how an apparatus may be installed at a particular site.
Figure 18:
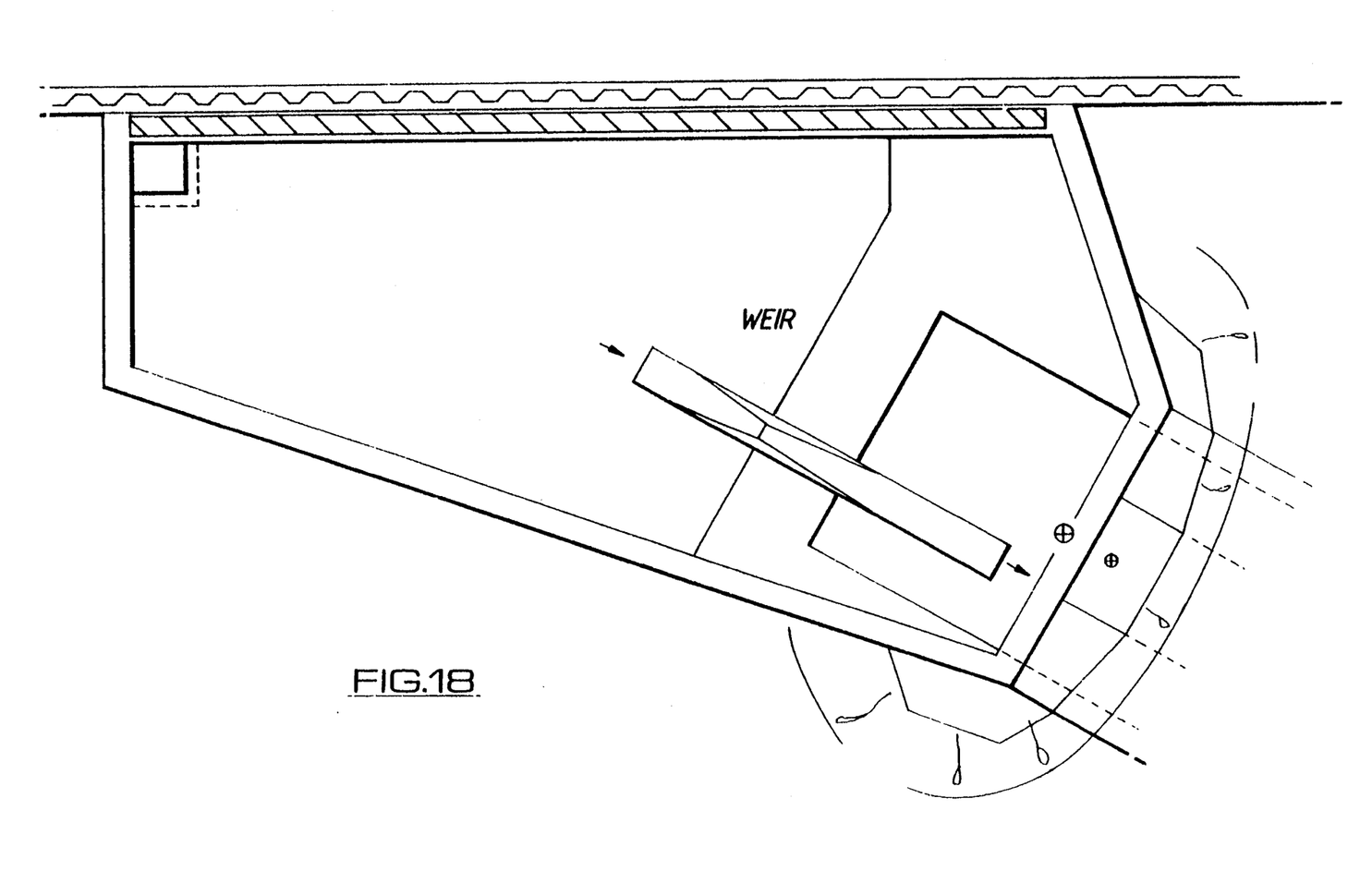

FIGS. 17 and 18 show an embodiment of the invention in location at an existing site. A weir or barrage 160 separates flowing river water into an upper basin 162 and a lower basin 164, forming upstream and downstream sections, corresponding to upstream and downstream locations 114 and 116 as shown in FIG. 14.

The conduit 120 is of the curved preferably antigravity form as shown in FIG. 15, and a consideration of FIG. 18 will show that the conduit may be relatively narrow compared to the width of the weir or barrage.

The apparatus as will be appreciated from the FIGS. 17 and 18 is extremely simple, and for repair and the like it can be adapted readily to be raised clear of the weir as required. There are no substantial fixing foundations required although it may be necessary to stabilise the conduit as to its position in relation ot the upstream and downstream basins.

When the conduit is removed from the weir or barrage, a sluice gate or the like in the barrage may be opened to allow the flow of liquid from upstream to downstream or other flow diverter means may be employed.

At the side, the upstream and downstream basins may in fact be off line of the river path, and control gates or the like may be arranged to divert water into the upstream basin when the energy extraction apparatus is to be put into use.

In the embodiment of the invention shown in FIG. 19, the air is again drawn in through turbine 126, but the outlet from the turbine is into a syphon header structure 160 into which extends an outlet pipe 162 so that water from the upstream side 114 is in fact syphoned into the header structure 160 and then exits through the pipe 162 as shown clearly in FIG. 19, the air passing through the turbine 126 being drawn into the downwardly flowing stream of water, and exiting from the downstream side 116 again as illustrated by arrow 130.

Figure 19:
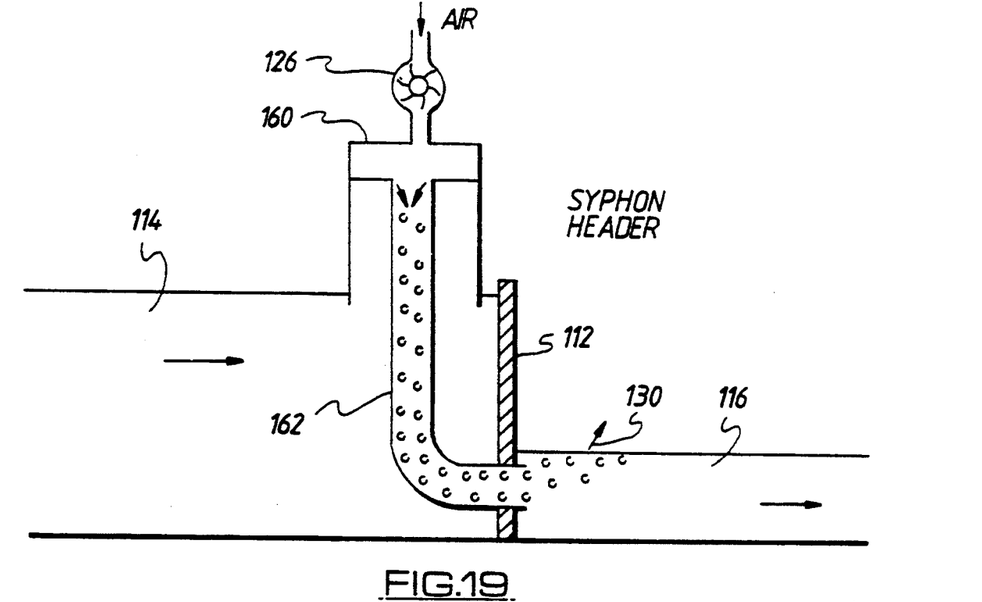
FIG. 19 is a view showing a further embodiment of the invention, the view being similar to FIG. 12.

By this arrangement, large quantities of air (up to 50% on the total) can be drawn into the down pipe 162. That is to say that any one time in the downpipe 62, the total content may comprise of 50% water and 50% air. The greater the quantity of air which can be drawn into the flowing water, the greater the power output and efficiency.

Figure 20:
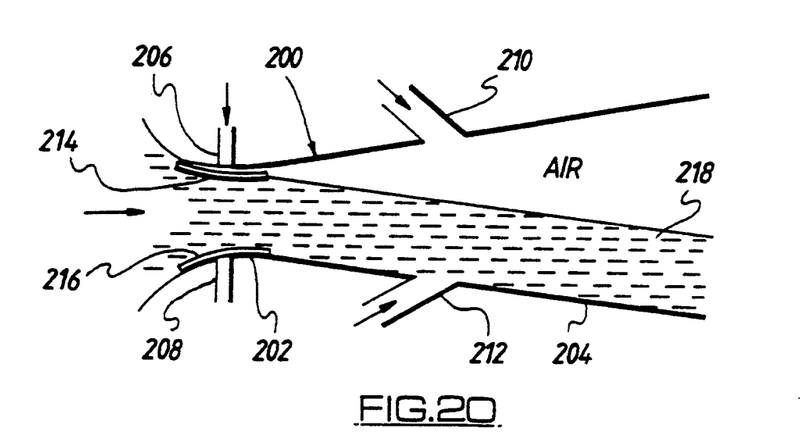
FIG. 20 is a plan of a further embodiment of the invention.
Figure 21:
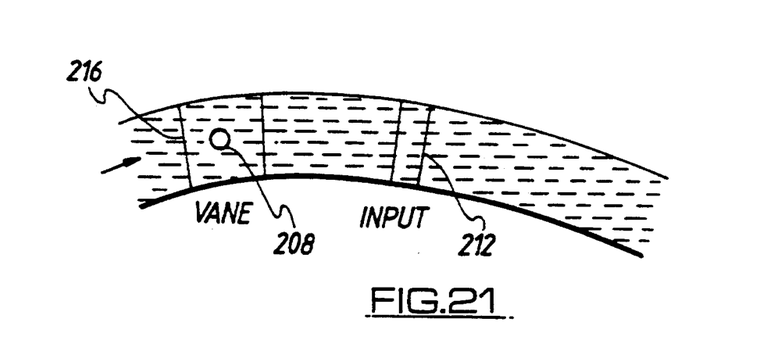
FIG. 21 is a side view of the embodiment of FIG. 20.

A further embodiment is shown in FIGS. 20 and 21 and this embodiment operates on the principle that if a jet of water comes into contact with an adjacent wall an effect called wall attachment takes place. The effect is due to fluid adjacent to the wall being swept away giving rise to low pressure at the wall surface. This causes the jet to bend towards the wall and remain attached to it along a gradual curvature. In the arrangement illustrated, the jet is again switched as it moves along duct 200 which in plan comprises a venturi throat 202, and a divergent downstream position 204. Pilot air inlets 206, 208 open into the throat 202 at opposite sides and main power air inlets 210, 212 open into the portion 204 at opposite sides as shown. The duct is preferably curved (in an antigravity curve) as shown in FIG. 21. Covering the pilot inlets 206, 208 are deflectible vanes 214, 216. The jet 218 is switched from one side of section 204 to the other by the pilot inlets 204, 208. The application of pressure pulses on vanes 214, 216 causes the guide vanes to move fractional amounts to switch the water jet from wall to wall and hence they can utilise simple leaf springs rather than hinged elements. Normal alignment of each guide vane induces wall attachment and jet detachment is achieved by switching the pilot air input to a higher pressure (normally atmospheric) relative to the low pressure within the venturi throat. The pressure difference across the vane causes it to bend away from the wall and hence detach the jet. The pilot air also feeds the space left by the switching jet.

The pilot operated jet described eliminates the need for switching of the power input air of the venturi-syphon systems identified in FIGS. 7 to 13 of the patent application. Connection of the main power air to both sides of the venturi downstream throat enables power air to be drawn into the pilot switched air side of the jet. The power air input therefore automatically switches into the venturi connections according to the low power switched pilot air. The power air drawn in is either drawn over a turbine as described herein or is supplied as a pressure medium to drive the turbine.

An important feature of the various embodiments of the invention disclosed herein is the simplicity in providing that atmospheric air is simply drawn into the water flow by virtue of its kinetic energy, and during the induction the air is drawn over an air driven prime mover from which energy in another form e.g. shaft energy and eventually electrical energy may be produced.

I claim:

1. An energy conversion system for use with a stream of flowing liquid which has energy, said system being adapted to convert the energy in liquid which flows from a higher level to a lower level, comprising duct means through which the liquid is caused to flow in flowing from said higher level to the lower level, means for introducing a gas into the duct means so that it is moved along the duct means by the flowing of liquid, and some of the potential energy in the gas, and including kinetic energy conversion means arranged to convert the kinetic energy of the gas into energy in a more readily usable form, characterized in that said duct means comprises a syphon duct and extends from the higher level to the lower level in a smoothly curved manner.

2. A system according to claim 1, wherein the duct has a venturi throat therein.

3. A system according to claim 2, wherein said means for introducing gas comprises a gas induction pipe means opening into said venturi throat.

4. A system according to claim 1, wherein said syphon duct is smoothly curved over a weir, and has a venturi throat at the crest.

5. A system according to claim 4, wherein the syphon duct is shaped in the form of an anti-gravity curve.

6. A system according to claim 4, wherein said means for introducing comprises a gas induction pipe means opening into said throat.

7. A system according to claim 1, wherein said syphon duct has a venturi member therein creating a venturi throat in the duct, and means mounting said venturi enabling it to be adjusted along the length of the duct for varying the position of the throat along the length of the duct.

8. A system according to claim 1, wherein the induction pipe has switched valve means located at the same length location of the duct means, and further includes means adapted to open and close the valve means alternately.

9. A system according to claim 8, wherein the duct is in two parallel sections and the gas is introduced by the switched valve means alternatively into the respective duct sections.

10. A system according to claim 8, wherein the switched valve means includes rockable vanes in the duct which direct the flow of liquid to one side and then the other of the said duct.

11. A system according to claim 6, wherein the energy conversion means is in the induction pipe.

12. A system according to claim 1, wherein there is means for collecting gas at the lower level and directing it into a gas outlet pipe.

13. A system according to claim 12, wherein the gas outlet pipe is connected to the means for introducing so that gas exiting the outlet pipe is recycled to the means for introducing.

14. A system according to claim 1, wherein the duct has a venturi throat and a downstream section of divergent shape.

15. A system according to claim 14, wherein the duct has pilot gas inlets at opposite sides of the venturi throat.

16. A system according to claim 15, wherein the pilot gas inlets are covered by displaceable vanes.

17. A system according to claim 16, wherein the vanes are spring plates.

18. A system according to claim 15 or 16, wherein there is means to apply pressure pulses alternately to said pilot inlets to deflect the flow of liquid alternately to opposite sides of the downstream section.

19. A system according to claim 14, including power gas induction pipes opening into the said downstream section, and through which pressure gas is induced by the flow of liquid.

20. A system according to claim 19, wherein the energy conversion means comprise a turbine located so as to be driven by the gas induced through the induction pipes.

21. A system according to claim 1, wherein the energy conversion means includes a gas turbine.

22. A system according to claim 1, wherein the energy conversion means includes an electric generator.

23. A system according to claim 1, wherein the flowing liquid is water of a stream, river or canal.

24. A system according to claim 1, wherein the gas is air drawn from the atmosphere.

25. An energy conversion system for use with a stream of flowing liquid which has energy, said system being adapted to convert the energy in liquid which flows from a higher level to a lower level, comprising duct means through which the liquid is caused to flow in flowing from said higher to the lower level, means for introducing a gas into the duct means so that it is moved along the duct means by the flowing of liquid, and some of the potential energy of the liquid is transferred into kinetic energy in the gas, and including kinetic energy conversion means arranged to convert the kinetic energy of the gas into energy in a more readily usable form, wherein said duct means is a syphon duct which extends from the higher level of a weir over the weir and down to the lower level and wherein said syphon duct has a venturi member therein creating a venturi throat in the duct, and means mounting said venturi member enabling it to be adjusted along the length of the duct for varying the position of the throat along the length of the duct.

26. A system according to claim 25, wherein the venturi member is in a leg of the duct which extends vertically downwards to said lower level.

27. An energy conversion system for use with a scream of flowing liquid which has energy, said system being adapted to convert the energy in liquid which flows form a higher level to a lower level, comprising duct means through which the liquid is caused to flow in flowing from said higher level to the lower level, means for introducing a gas into the duct means so that it is moved along the duct means by the flowing of liquid, and some of the potential energy of the liquid is transferred into kinetic energy in the gas, and including kinetic energy conversion means arranged to convert the kinetic energy of the gas into energy in a more readily usable form and wherein the induction pipe has switched valve means located at the same length location of the duct means, and further includes means adapted to open and close the valve means alternately.

28. A system according to claim 27, wherein the duct is in two parallel sections and the gas is introduced by the switched valve means alternatively into the respective duct sections.

29. A system according to claim 27, wherein the switched valve means includes rockable vanes in the duct which direct the flow of liquid to one side and then the other of the said duct.

* * * * *